Patented Sept. 15, 1936

2,054,285

UNITED STATES PATENT OFFICE 2,054,285

PLASTIC COMPOSITION

Benjamin Foster, Philadelphia, Pa.

No Drawing. Application August 3, 1933,
Serial No. 683,473

3 Claims. (Cl. 106—31)

My invention relates to plastic compositions of the type which comprise a plastic base, particularly of a bituminous or resinous character. The compositions comprised by my invention are adapted to a wide field of uses: for cements, as, for example, in the preparation of laminated bodies; paints; fillers; insulators; in sound deadening material; and so forth.

The primary purpose of my invention is to provide plastic compositions having high degrees of flexibility and toughness over a wide range of atmospheric temperatures including sub-zero temperatures, but which will withstand elevated temperatures of the order of 200° F. to 300° F. or even higher without "running" or losing their form. My compositions retain their flexibility and toughness indefinitely and they do not become brittle nor lose their flexibility when subjected to use in severely cold climates. Yet while they possess this great degree of flexibility and toughness at ordinary and at low temperatures, they may be subjected to prolonged exposure to temperatures of from 200° F. to 300° F., or even higher temperatures, without ill effects upon the form, or structure, of the plastic mass, whether that mass be a coating, a layer of cement, a filler, or any of the other applications of these compositions. Furthermore, once these compositions have "set" their chemical constitution remains practically unaltered whether by low temperature or temperatures of the order of 200° to 300° F. Even when they have been repeatedly subjected to prolonged exposure to elevated temperatures of the order above indicated they still retain their desirable flexibility and toughness when again subjected to low temperatures.

My invention is based upon my discovery that the cohesiveness of bituminous and resinous substances at elevated temperatures is greatly increased by the presence of absorbents. I have discovered that by mixing absorbents with a plastic base in such manner that the absorbents are substantially uniformly distributed through the mass of the plastic base, and with the absorbents thoroughly impregnated with the plastic base material, the cohesiveness of the resulting composition is greatly increased, with the consequence that the final composition "holds together" very efficiently at elevated temperatures, temperatures in fact, greatly in excess of the melting point of the plastic base.

By the use of suitable absorbents in the proper quantity it is possible to render resinous and bituminous substances of relatively low melting points resistant to various disintegrating effects at relatively high temperatures, such as "running", slipping, buckling and blistering.

This effect may be obtained not only with fibrous absorbents such as asbestos and cork but also with the finely divided, non-fibrous absorbents such, for example, as kieselguhr.

To obtain the great flexibility and toughness possessed by my compositions at ordinary and low atmospheric temperatures, it is needful that the plastic base employed shall have a melting point which does not substantially exceed 135° F. In fact, I prefer to employ plastic bases with melting points lower than this figure, say of the order of 110° to 125° F.

When, for example, a low melting point asphalt, having say a melting point of 120° F., is melted and a suitable amount of kieselguhr is mixed therewith to give a composition in which the kieselguhr is substantially uniformly distributed through the asphalt and the pores and other interstices of the kieselguhr are thoroughly impregnated with asphalt, the cohesiveness of the resulting product at elevated temperatures is much greater than that of the original asphalt.

I appreciate the fact that plastic compositions have been prepared heretofore which comprise mixtures of bituminous materials and absorbents, in which the bituminous constituent may have melting points appreciably lower than the temperatures at which the plastic compositions may be used. But so far as I am aware no one prior to myself has ever recognized the fact that a plastic composition might be prepared resistant to disintegrating influences at temperatures of 200 to 300° F. or higher in which the plastic base is a substance or mixture of substances having a melting point of 135° F. or even substantially lower. By using a plastic base of such a low melting point the resulting plastic composition is given exceptionally high degrees of flexibility and toughness which are retained even at very low atmospheric temperatures.

Several examples will serve to illustrate my invention.

I have obtained excellent results from mixtures of

|                          | Per cent |
|--------------------------|----------|
| Steam distilled asphalt  | 30 to 60 |
| Asbestos fiber           | 40 to 70 |

In these cases the steam distilled asphalt had a penetration of 85 to 100; a specific gravity at 60° F. from 1.00 to 1.03; a flash point somewhat over 500° F. and a melting point between 118° and 125° F. The asbestos employed was in the form of short fibers, between ⅛ and ¼ inch in lengths.

The steam distilled asphalt was heated to a temperature from 300° to 350° F., the asbestos then added thereto, and the mixture thoroughly stirred. The asphalt at this temperature had sufficient fluidity to enter readily into the pores and other interstices of the asbestors to thoroughly impregnate the same. In this example of my invention the asphalt constituted what I designate the "plastic base" and the asbestos constituted the absorbent.

Compositions of the formulae just given may be used for a variety of purposes. They are adapted for use as fillers, plasters, packings, waterproofings, and for sound deadening. As they have a putty-like consistency they are especially adapted to be applied by means of a calking tool.

When I desire a fluid or semi-fluid consistency I may employ various volatile solvents. For example, I may proceed as follows: An asphaltic "cut back" is prepared by melting the asphalt and mixing naphtha (varnish maker's and painter's naphtha) therewith, to which is then added the asbestos. I have found the following to be a useful mixture.

| | Per cent |
|---|---|
| Asphalt "cut back" | 72 |
| Asbestos | 28 |

The asphalt "cut back" of this particular example consisted of

| | Per cent |
|---|---|
| Steam distilled asphalt | 50 |
| Naphtha | 50 |

The asphalt used was similar to that previously mentioned, having a melting point between 118° and 125° F. The composition of this example is of spray gun consistency and it is especially adapted to purposes where it is desired to apply a plastic composition in this manner.

In the example just given it should be noted that, as in the previous example, the "plastic base" of the composition is the low melting point asphalt, the naphtha merely acting as a solvent vehicle and ultimately separating from the composition by evaporation. After volatilization of the naphtha, it will be apparent, the remaining composition will contain 36 parts of asphalt to 28 parts of asbestos, or, expressing it in percentages, about 56% and 44% respectively of asphalt and asbestos. In connection with this example I wish to make it clear that when, as in certain of the claims to this application, I refer to percentages of "plastic base" in my compositions, I am referring to the percentages present in the compositions when free or substantially free from volatiles. For instance, in the composition of the example just given, the plastic base constitutes 56% of the composition.

As already indicated my invention involves the use of a relatively low melting point plastic base. In the examples given above a low melting point asphalt is used for this plastic base. I may, however, use a relatively high melting point asphalt by mixing therewith a non-volatile oil in sufficient amount to produce a low melting point plastic base.

For example, I may melt together 20% gilsonite and 80% road oil to produce a plastic base having a melting point substantially the same as that of the steam distilled asphalt given above. Such a plastic base may be substituted for the low melting point asphalt in the formulae given above and the same satisfactory results secured of flexibility, toughness and resistance to disintegrating effects at elevated temperatures. As "road oil" I have employed a petroleum asphaltic oil having an Egler viscosity of 30 to 40 units at 104° F. and which is 99½% soluble in carbon disulphide.

Instead of a non-volatile oil for lowering the melting point of a high melting point asphalt, as in the preceding example, I may use other substances such, as for instance, waxes and paraffines of suitable melting points. In preparing a low melting point asphaltic base from a high melting point asphalt what is requisite is the use of a substance which will "flux" with the asphalt, which has a sufficiently low melting point to lower the melting point of the asphalt, and which has a sufficiently high volatilization or flash point.

I may use other types of plastic bases, such as natural gums, synthetic resins, and the like. Likewise I may use a wide variety of absorbents. In each case, however, the plastic base must be of a relatively low melting point, 135° F., or lower, to produce the great toughness and flexibility, and sufficient of the absorbent to produce the holding power at temperatures of the order of 200° to 300° F. or higher.

Instead of asbestos I may employ absorbents such as finely divided cork, kieselguhr, cotton fiber and so forth. I may also use several different absorbents in the same composition. A useful formula comprises both asbestos and cork, as for example, the following:

| | Per cent |
|---|---|
| Cork, 100 mesh | 10 |
| Asbestos, 100 mesh | 10 |
| Asphaltic "cut back" | 80 |

The asphaltic "cut back" of this formula comprises steam distilled asphalt, having a melting point of about 120° F., 65%, and naphtha 35%.

Plastic bases of a very efficient character may be employed using other substances than the asphalts, as has already been indicated. As an example, a low melting point plastic base may be made by melting together coumarone-indine resin with wax tailings. As this synthetic resin has a melting point of 160° F., sufficient of the wax tailings should be used to give a plastic base having a melting point of 135° F. or lower, preferably 125° F. or even lower. I obtain some of my most effective compositions, in actual practice, with plastic bases having a melting point of about 110° F. This plastic base may be mixed with asbestos, cork or other absorbents in the same relative proportions as in the previous examples involving the use of asphalt. For instance, with a plastic base of this type I have successfully used asbestos in an amount of 40% to 60%.

In general it may be stated that the plastic base whatever its type should constitute between 30% and 60% of the finished composition. As indicated earlier in this specification, the percentage of the plastic base is estimated upon the composition when free or substantially free from volatile solvents.

The remaining percentage of this composition may be made up entirely of absorbents as in the illustrative formulae above. However, it is within the scope of my invention to use with absorbents, various fillers having little or no absorbing power, such as powdered limestone, ground slate, and silica. In other words, there may be a partial substitution of non-absorbents for absorbents. In substituting a non-absorbing filler for a part of the absorbent it is usually necessary to employ a somewhat greater quantity of the non-absorbent filler than the quantity of absorbent which it replaces in the composition. If, in a particular formula, calling for 40% of powdered cork, it is decided to reduce the cork to 30%, to obtain approximately the same properties of the original formula, it may be necessary to add 20% of the non-absorbent filler. It is to be borne in mind, however, that these non-absorbing fillers are never to be substituted in entirety for the absorbents. To obtain the desirable effects of my invention it is necessary that a considerable proportion of absorbent be present.

For obtaining the most satisfactory results with my compositions "dryers" should be absent, or at most, should be present in unsubstantial amounts.

While my plastic compositions are adapted to a wide field of uses, as already pointed out, they are particularly valuable in situations where the matter of adherence to other bodies is concerned. Where it is important to apply plastics in a fluid or semi-fluid condition these compositions are especially useful because of their unusual adhesiveness in this condition.

It is now a common practice to apply plastics with some form of spraying apparatus. Volatile solvents are commonly used to obtain the desired fluidity of plastic for this purpose. To obtain sufficient fluidity it is usually necessary to use such a large amount of solvent that the plastic composition striking the body being treated therewith does not adhere well. This is particularly true when plastic compositions are being applied to metal surfaces. My compositions possess decided advantages in these situations. In addition to their natural cohesive and adhesive properties my compositions, because of the low melting points of the plastic bases employed, require less solvent to attain the necessary fluidity, and the diminution in adhesiveness due to the presence of the large amounts of solvent, is obviated.

Having thus described my invention what I claim as new and desire to secure by Letters Patent is:

1. A plastic composition having high degrees of flexibility and toughness over a wide range of atmospheric temperatures, comprising a plastic base substantially free from dryers having a melting point less than 130° F. from 30% to 60%, and an absorbent, substantially uniformly distributed throughout the mass of the plastic base and being impregnated with the plastic base, in amounts from 40% to 70%, said plastic composition having the capacity of withstanding temperatures of from 200° to 300° F., and being flexible and tough at low atmospheric temperatures.

2. A plastic composition having high degrees of flexibility and toughness over a wide range of atmospheric temperatures, comprising a bituminous base substantially free from dryers having a melting point less than 130° F. from 30% to 60%, and an absorbent, substantially uniformly distributed throughout the mass of the bituminous base and being impregnated with the bituminous base, in amounts from 40% to 70%, said plastic composition having the capacity of withstanding temperatures of from 200° to 300° F., and being flexible and tough at low atmospheric temperatures.

3. A plastic composition having high degrees of flexibility and toughness over a wide range of atmospheric temperatures, comprising an asphaltic base substantially free from dryers having a melting point less than 130° F. from 30% to 60%, and asbestos, substantially uniformly distributed throughout the mass of the asphaltic base and being impregnated with the asphaltic base, in amounts from 40% to 70%, said plastic composition having the capacity of withstanding temperatures of from 200° to 300° F., and being flexible and tough at low atmospheric temperatures.

BENJAMIN FOSTER.